(12) United States Patent
Round et al.

(10) Patent No.: US 9,033,413 B2
(45) Date of Patent: May 19, 2015

(54) PREMIUM CLASS AIRCRAFT PASSENGER SUITE

(71) Applicant: B/E Aerospace, Inc., Wellington, FL (US)

(72) Inventors: Matt Round, London (GB); Martin Darbyshire, London (GB); Ollie Price, London (GB); Lucas Tretout, London (GB); Weiwei He, London (GB); Tommy George Plant, Advance, NC (US); Alexander Nicholas Pozzi, Winston-Salem, NC (US); Glenn Allen Johnson, Rural Hall, NC (US)

(73) Assignee: B/E Aerospace, Inc., Wellington, FL (US)

( * ) Notice: Subject to any disclaimer, the term of this patent is extended or adjusted under 35 U.S.C. 154(b) by 120 days.

(21) Appl. No.: 13/798,783

(22) Filed: Mar. 13, 2013

(65) Prior Publication Data
US 2013/0241246 A1 Sep. 19, 2013

Related U.S. Application Data

(60) Provisional application No. 61/612,623, filed on Mar. 19, 2012, provisional application No. 61/612,651, filed on Mar. 19, 2013, provisional application No. 61/612,543, filed on Mar. 19, 2012, provisional application No. 61/613,558, filed on Mar. 21, 2012, provisional application No. 61/613,551, filed on Mar. 21, 2012.

(51) Int. Cl.
*B64D 11/06* (2006.01)
*B60N 2/32* (2006.01)
*B64D 11/00* (2006.01)

(52) U.S. Cl.
CPC . *B64D 11/06* (2013.01); *B60N 2/32* (2013.01); *B64D 2011/0069* (2013.01); *Y02T 50/46* (2013.01); *B64D 11/064* (2014.12); *B64D 11/0641* (2014.12); *B64D 11/0604* (2014.12)

(58) Field of Classification Search
CPC ............ B60N 2/32; B60N 2/34; B64D 11/06; B64D 2011/0069
USPC .............. 297/118, 135, 232; 244/118.5, 118.6
See application file for complete search history.

(56) References Cited

U.S. PATENT DOCUMENTS

| | | | | |
|---|---|---|---|---|
| 2,357,729 | A * | 9/1944 | De Fries | 5/118 |
| 7,188,806 | B2 * | 3/2007 | Beroth | 244/122 R |
| 7,837,262 | B2 * | 11/2010 | Merensky | 297/217.3 |
| 8,011,723 | B2 * | 9/2011 | Park et al. | 297/118 |
| 2007/0170310 | A1 * | 7/2007 | Bock et al. | 244/118.5 |
| 2011/0210205 | A1 * | 9/2011 | Bock et al. | 244/118.6 |

\* cited by examiner

*Primary Examiner* — Philip Gabler
(74) *Attorney, Agent, or Firm* — Shumaker, Loop & Kendrick, LLP

(57) ABSTRACT

A premium class passenger suite that includes a main seat positioned in the suite together with separate bed. The bed has a flexible mattress of predetermined dimensions and is movable between a stowed position to one side of the main seat and a deployed position above and separate from the main seat. A drive apparatus is provided for driving the bed between the stowed and deployed positions. The main seat is configured to be movable between a seating position when the bed is stowed, and a stowed position with a lowered seat back when the bed is deployed for use.

17 Claims, 21 Drawing Sheets

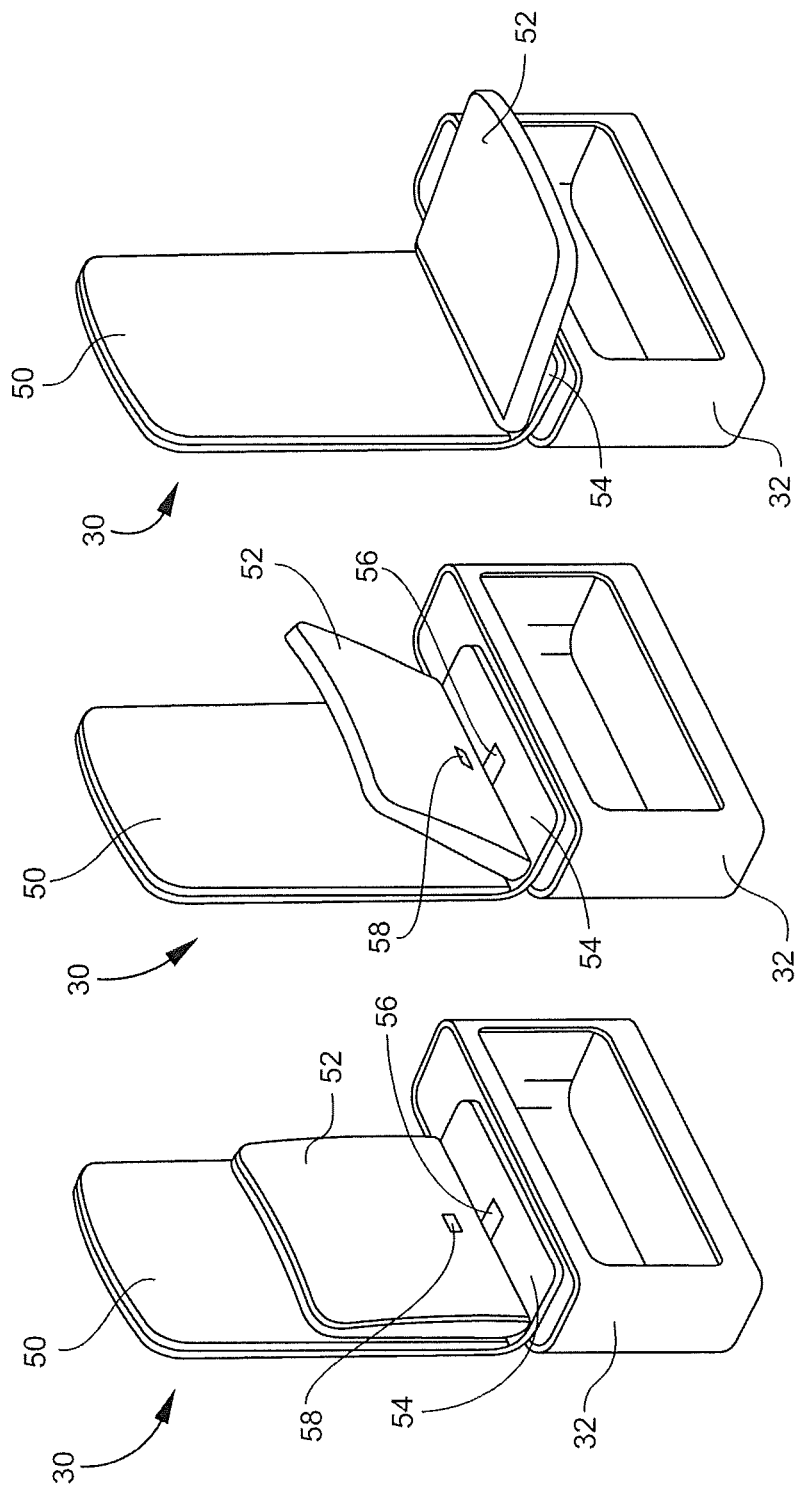

PREMIUM CLASS AIRCRAFT PASSENGER SUITE

TECHNICAL FIELD AND BACKGROUND OF THE INVENTION

The present invention relates to a premium class aircraft passenger suite that includes several unique features that provide enhanced passenger comfort, weight savings and efficient space utilization. The passenger suite includes a separate seat and bed that permit the seat and bed structures to be optimized for sitting and sleeping, respectively. Other features permit the passenger suite to be efficiently used by the passenger for sleeping, working, dining and video viewing.

Conventional prior art aircraft passenger suite beds are typically formed by reclining an aircraft seat back into generally horizontal alignment with a seat bottom, and then providing additional sleeping room by using a leg and/or foot rest or ottoman as supplemental surfaces. This arrangement has the disadvantages of providing a sleeping surface that is too hard for comfortable sleeping, having gaps or spaces between the bed segments that are uncomfortable, and requiring that the bed be "made up" by a flight attendant after bed deployment during flight while the passenger waits in the aisle.

The present invention offers a solution to these problems by providing a bed that is a separate and distinct structure from the passenger seat and that deploys into a flat sleeping surface having a proper firmness, and that is already covered with a sheet or other bed covering, which can therefore be prepared for use during aircraft servicing in preparation for flight. Other features include the ability of the passenger to move to a more comfortable, ergonomic upright chair for working and/or dining, and the ability of a second passenger to work or dine with the suite occupant—one passenger occupying the main seat, and the second passenger occupying the work/dining chair.

SUMMARY OF THE INVENTION

Therefore, it is an object of the present invention to provide a premium class aircraft passenger suite bed that is separate from the aircraft main passenger seat, referred to in this application as the "main seat".

It is a further object of the invention to provide a premium class aircraft passenger suite bed that has a firmness suitable for sleeping.

It is a further object of the invention to provide a premium class aircraft passenger suite bed that can be covered with a sheet or other bed covering and stowed in that condition until ready for deployment and use during flight.

It is a further object of the invention to provide a premium class aircraft passenger suite that is optimized for dining, working, sleeping and video viewing within a compact, space-efficient position.

These and other objects and advantages are achieved by providing an aircraft passenger bed for a premium class passenger suite that includes a flexible bed having predetermined dimensions suitable for use in an aircraft passenger suite and movable between a stowed position to one side of a main seat in the suite and a deployed position above and separate from the main seat. A drive apparatus drives the bed between the stowed and deployed positions. The bed provides enhanced comfort and can be provided with bed linens before a flight and stowed in that condition until deployment during flight.

According to one preferred embodiment of the invention, a premium class passenger suite is provided that includes comprising a main seat positioned in the suite and a bed having a flexible mattress of predetermined dimensions and movable between a stowed position to one side of the main seat, and a deployed position above and separate from the main seat. A drive apparatus is provided for driving the bed between the stowed and deployed positions. The main seat is configured to be movable between a seating position when the bed is stowed, and a stowed position with a lowered seat back when the bed is deployed for use. The seat in its stowed position is beneath and separate from the bed.

According to another preferred embodiment of the invention, first and second spaced-apart end walls are provided, and are adapted to be positioned along a longitudinal axis of an aircraft cabin to define an enclosure therebetween. The main seat is positioned adjacent the first end wall of the passenger suite, and includes a seat bottom, left and right arm rests, and a seat back facing the second end wall of the passenger suite.

According to another preferred embodiment of the invention, the bed includes an elongate cabinet extending along the length of the suite between the first and second end walls, a flexible membrane positioned in the cabinet and movable between a stowed, folded position and a deployed unfolded position extending across a width of the suite between the first and second end walls, and a mattress positioned in an overlying position on the membrane and movable with the membrane between a stowed, folded position and a deployed unfolded position extending across a width of the suite between the first and second end walls.

According to another preferred embodiment of the invention, a work/dining chair is positioned adjacent the second end wall of the suite and facing in a direction perpendicular to the main seat, and a work/dining table positioned on the elongate cabinet opposite the work/dining chair and movable between a stowed position above the cabinet and a deployed use position between the cabinet and the work/dining chair.

According to another preferred embodiment of the invention, a work/dining chair is positioned adjacent the second end wall of the suite and facing in a direction perpendicular to the main seat. A first work/dining table is positioned on the cabinet opposite the work/dining chair and is movable between a stowed position above the cabinet and a deployed use position between the cabinet and the work/dining chair. The cabinet has a front panel that includes a foot recess which permits feet of a work/dining chair occupant to be positioned in natural, comfortable position. A second table is positioned on the cabinet and is pivotable between a stowed position above the cabinet and a deployed use position in front of the main seat.

According to another preferred embodiment of the invention, the work/dining chair includes a base on which is positioned a chair bottom that is movable between a deployed seating position and a raised, stowage position.

According to another preferred embodiment of the invention, the work/dining chair includes a base on which is positioned a chair bottom that is movable between a deployed seating position and a raised, stowage position, the deployed seating position being in an interference position with the bed when deployed. An electromagnet is positioned on the base for holding the chair bottom in a lowered, deployed seating position when energized by interaction with a ferrous material located on the chair bottom. A synchronization assembly is provided for electrically synchronizing the deployment of the bed with the chair bottom whereby, as the bed begins to deploy, the electromagnet is de-energized, releasing the chair bottom and allowing it to rise to its stowed position under the influence of a lifting mechanism.

According to another preferred embodiment of the invention, a premium class passenger suite that includes a main seat positioned in the suite. A bed is also provided in the suite, having a flexible mattress of predetermined dimensions that is movable between a stowed position to one side of the main seat, and a deployed position above and separate from the main seat. A drive apparatus is provided for driving the bed between the stowed and deployed positions, and the main seat is configured to be movable between a seating position when the bed is stowed, and a stowed position with a lowered seat back when the bed is deployed for use, the seat in its stowed position being beneath and separate from the bed. First and second spaced-apart end walls are provided, and are adapted to be positioned along a longitudinal axis of an aircraft cabin to define an enclosure therebetween. The main seat is positioned adjacent the first end wall of the passenger suite, and includes a seat bottom, left and right arm rests, and a seat back facing the second end wall of the passenger suite. An elongate cabinet extends along the length of the suite between the first and second end walls. A flexible membrane is positioned in the cabinet and is movable between a stowed, folded position and a deployed unfolded position extending across a width of the suite between the first and second end walls. A mattress is positioned in an overlying position on the membrane and is movable with the membrane between a stowed, folded position and a deployed unfolded position extending across a width of the suite between the first and second end walls.

According to another preferred embodiment of the invention, a work/dining chair is positioned adjacent the second end wall of the suite and faces in a direction perpendicular to the main seat. A work/dining table is positioned on the elongate cabinet opposite the work/dining chair and is movable between a stowed position above the cabinet and a deployed use position between the cabinet and the work/dining chair.

A method of providing sitting, sleeping, working and dining features for a passenger of a premium class passenger suite according to a preferred embodiment of the invention includes the steps of providing a main seat, a bed having a flexible mattress of predetermined dimensions and movable between a stowed position to one side of the main seat and a deployed position above and separate from the main seat, and a drive apparatus for driving the bed between the stowed and deployed positions. The main seat is configured to be movable between a seating position when the bed is stowed and a stowed position with a lowered seat back when the bed is deployed for use, the seat in its stowed position being beneath and separate from the bed, and first and second spaced-apart end walls adapted to be positioned along a longitudinal axis of an aircraft cabin to define an enclosure therebetween.

According to another preferred embodiment of the invention, the method includes the step of positioning the main seat adjacent the first end wall of the passenger suite, and providing the main seat with a seat bottom, left and right arm rests, and a seat back facing the second end wall of the passenger suite.

According to another preferred embodiment of the invention, the method includes the steps of providing an elongate cabinet extending along the length of the suite between the first and second end walls, a flexible membrane positioned in the cabinet and movable between a stowed, folded position and a deployed unfolded position extending across a width of the suite between the first and second end walls, and a mattress positioned in an overlying position on the membrane and movable with the membrane between a stowed, folded position and a deployed unfolded position extending across a width of the suite between the first and second end walls.

According to another preferred embodiment of the invention, the method includes the steps of providing a work/dining chair positioned adjacent the second end wall of the suite and facing in a direction perpendicular to the main seat, and a work/dining table positioned on the elongate cabinet opposite the work/dining chair and movable between a stowed position above the cabinet and a deployed use position between the cabinet and the work/dining chair.

According to another preferred embodiment of the invention, the method includes the steps of providing a work/dining chair positioned adjacent the second end wall of the suite and facing in a direction perpendicular to the main seat and a first work/dining table positioned on the cabinet opposite the work/dining chair and movable between a stowed position above the cabinet and a deployed use position between the cabinet and the work/dining chair. The cabinet has a front panel that includes a foot recess which permits feet of a work/dining chair occupant to be positioned in natural, comfortable position. A second table is positioned on the cabinet and is pivotable between a stowed position above the cabinet and a deployed use position in front of the main seat.

According to another preferred embodiment of the invention, the method includes the steps of providing a base for the work/dining chair. The chair bottom of the work/dining chair is positioned on the base and is movable between a deployed seating position and a raised, stowage position.

BRIEF DESCRIPTION OF THE DRAWING FIGURES

The present invention is best understood when the following detailed description of the invention is read with reference to the accompanying drawings, in which.

Figure 24:
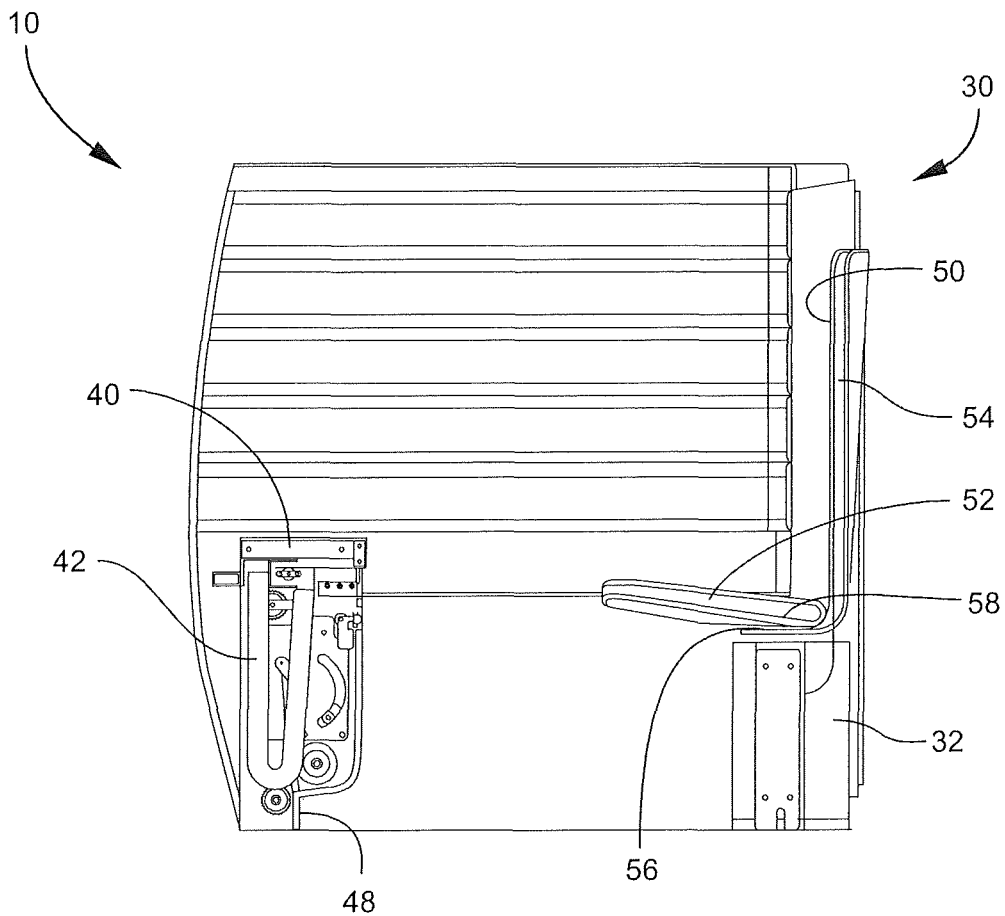
Figure 25:
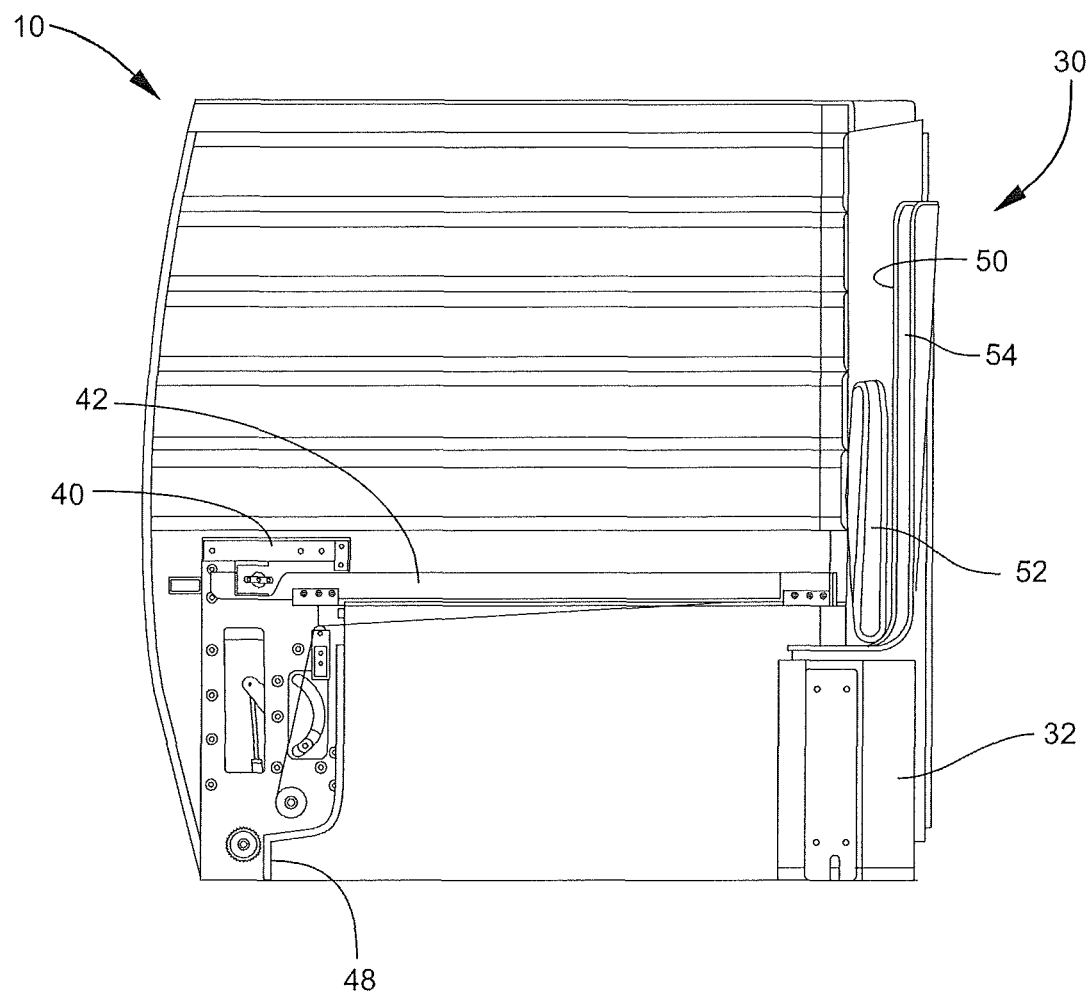
Figure 26:
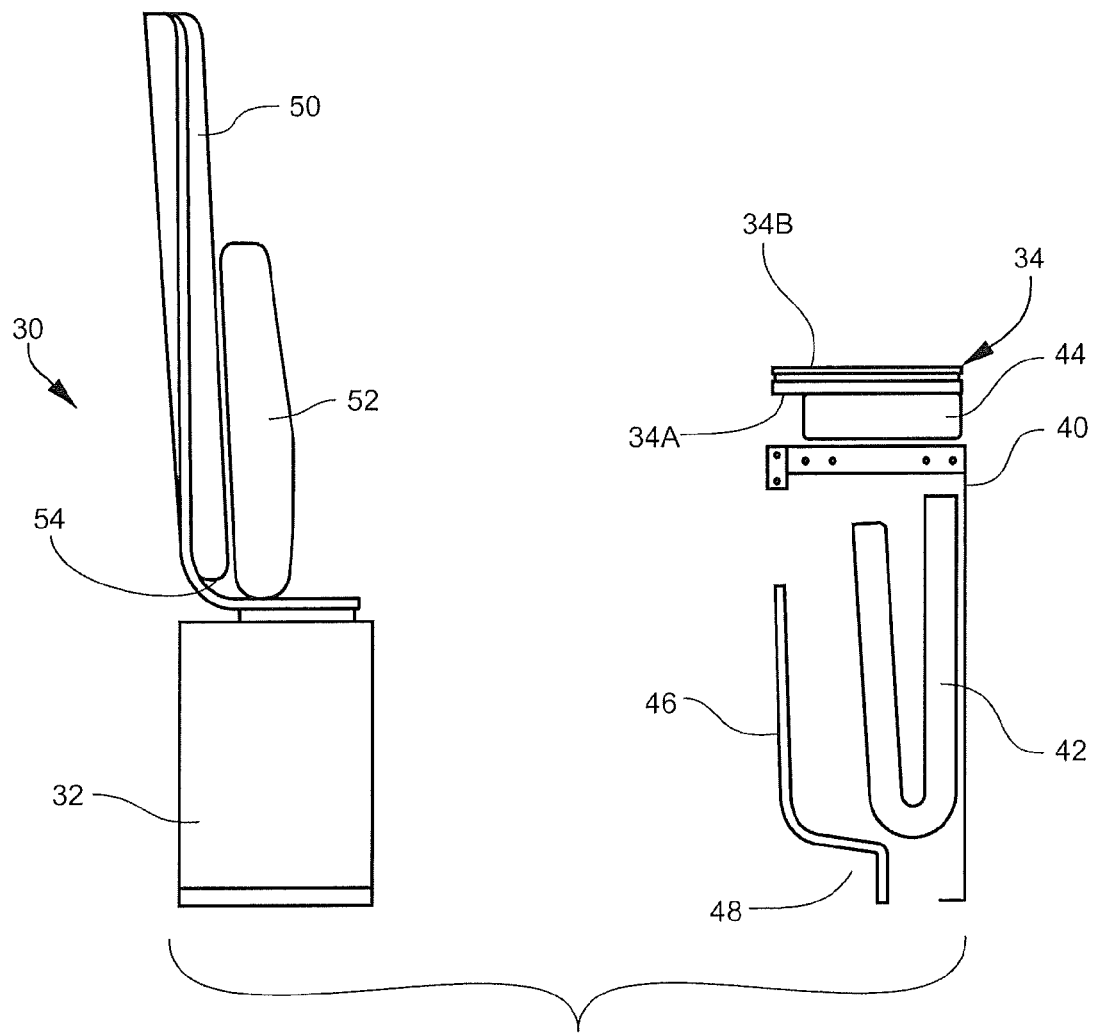
Figure 27:
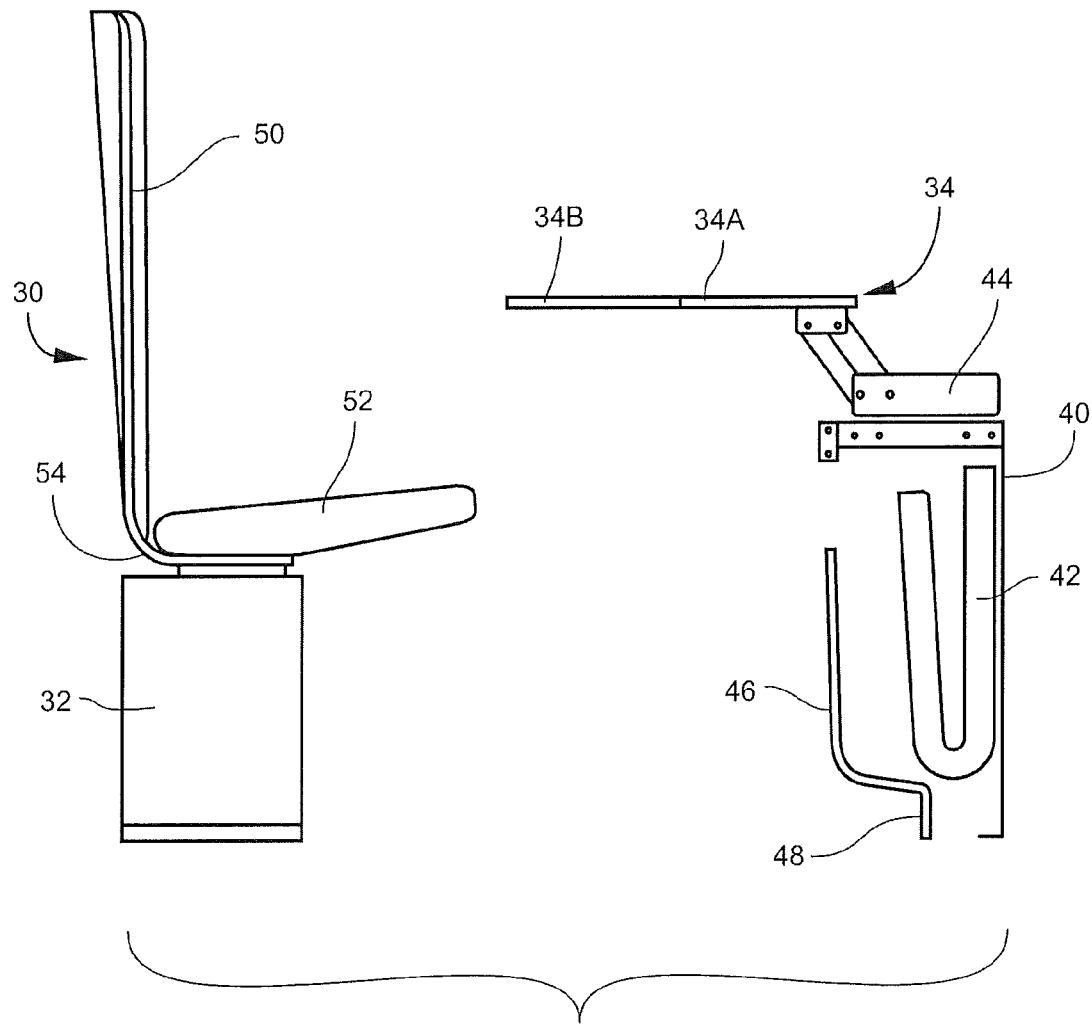

FIGS. 21, 22, and 23 are sequential perspective views showing the work/dining chair in its stowed position, in an intermediate deploying position and in a deployed position, respectively;

FIG. 24 is a partial end elevation showing the vertical relationship between the stowed bed and the deployed work/dining chair;

FIG. 25 is a partial end elevation showing the vertical relationship between the deployed bed and the stowed work/dining chair;

FIG. 26 is a fragmentary side elevation view showing the work/dining chair and the work/dining table in their respective stowed positions; and FIG. 27 is a fragmentary side elevation view showing the work/dining chair and the work/dining table in their respective deployed positions.

DETAILED DESCRIPTION OF THE PREFERRED EMBODIMENT

Referring now to the drawings, a premium class passenger suite 10 is shown, and includes front and rear privacy panels 12, 14 and a slidable side privacy panel 16. The suite 10 in FIGS. 1 and 2 views extends along a length of the aircraft fuselage "F", which forms one side of the suite 10.

A main seat 20 that includes a seat back 22, seat bottom 24, and left and right armrests 26, 28 is provided for passenger use during taxi, take-off, landing and in-flight relaxation, video viewing, upright or semi-reclined reading and the like. A work/dining chair 30 sits on a storage box 32 at right angles to the main seat 20. The suite 10 also contains work/dining tables 34, 36, a video display monitor, main seat controls and electronics controls, not shown.

Figure 1:
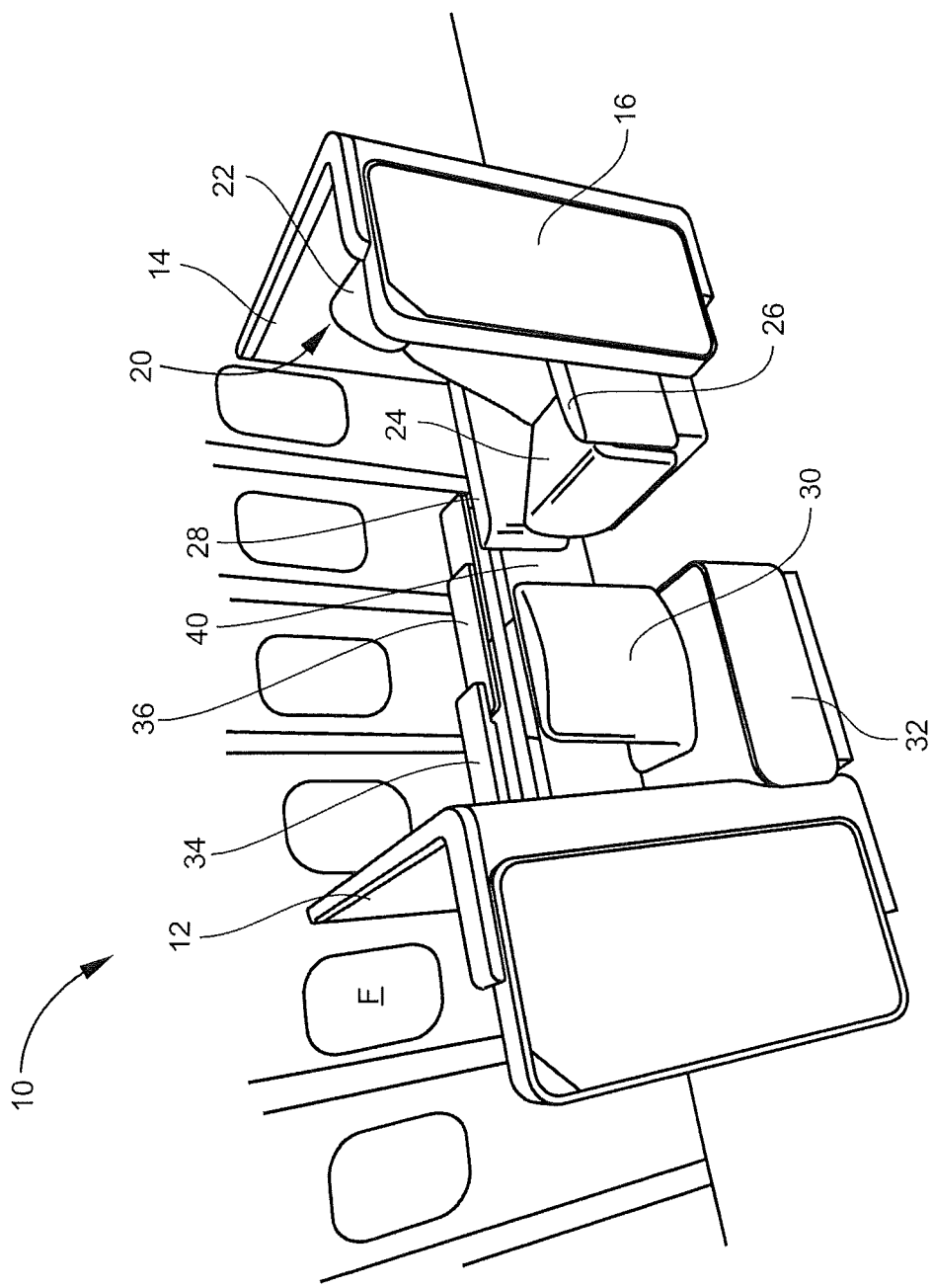
FIG. 1 is a perspective view of a premium class aircraft passenger suite in the seating configuration.
Figure 2:
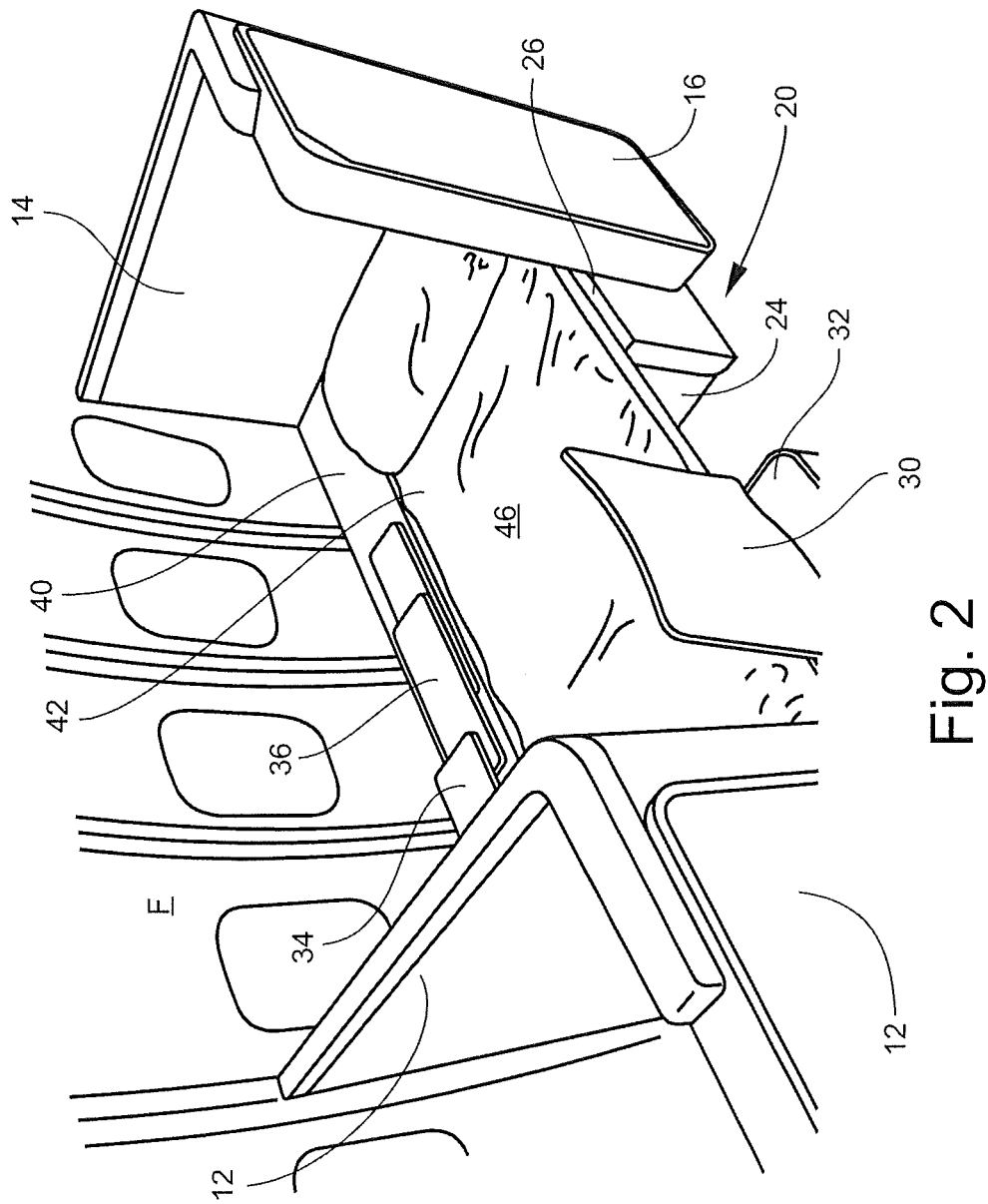
FIG. 2 is a perspective view of a premium class aircraft passenger suite in the deployed bed configuration.

As shown in FIG. 2, an elongate cabinet 40 extends along the length of the suite 10 adjacent the aircraft fuselage "F" and contains a roll-out membrane bed 42. The main seat 20 and bed 42 are separate elements. The seat back 22 folds forward, stowing face down above the seat bottom 24, and at the same time the left and right armrests 26, 28 are lowered, making space for the roll-out membrane bed 42. As is best shown by comparing FIG. 1 and FIG. 2, the bed 42 occupies the space above the folded seat back 22 and the space that was previously occupied by the seat back 22 in its upright position when in use as the seat. As is also shown, the foot end of the bed 42 is supported over the dining chair 30. The movement of the seat bottom 24, seat back 22 and deploying bed 42 are electronically driven, interlinked and operated by a single switch.

When the bed 42 is deployed, a 2 inch gap is provided between the stowed surface of the seat back 22 and the underside of the bed 42. This 2 inch gap allows for a deflection of the bed 42 to create comfort for the recumbent passenger.

The bed 42 is formed in one complete flexible surface that includes an underlying membrane 44 that supports a mattress 46, without joints in the mattress 46, as opposed to combination multiple padded surfaces, such as is common in lay-flat aircraft seating. A suitable material for use as the membrane 44 is a synthetic polymer sold under the trademark Krystal-Flex. By designing the main seat 20 and the bed 42 as separate elements that do not need to convert from one use to another, each can be designed to optimize the comfort for its intended use. The bed 42 stows in a compact space within the cabinet 40 that is approximately 8.7 inches wide. The bed 42 deploys with the sheet or other bed coverings attached to it ready for the passenger to use.

Figure 4:
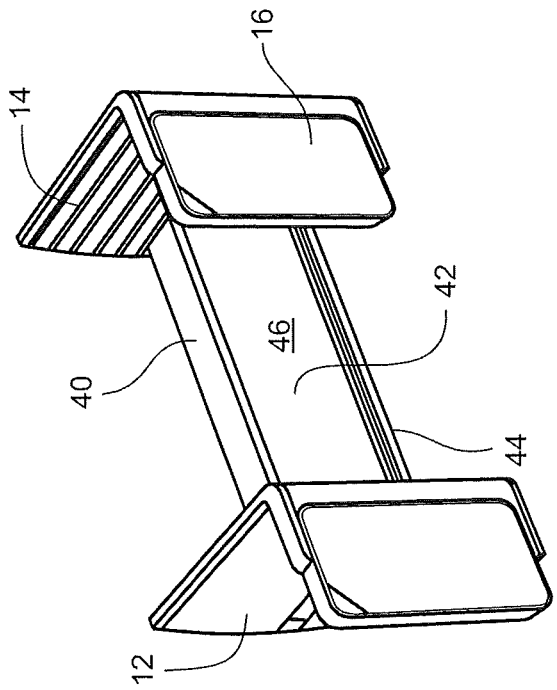
FIG. 4 is a perspective view of a premium class aircraft passenger suite, with the seating elements omitted, showing the bed in a deployed position.
Figure 3:
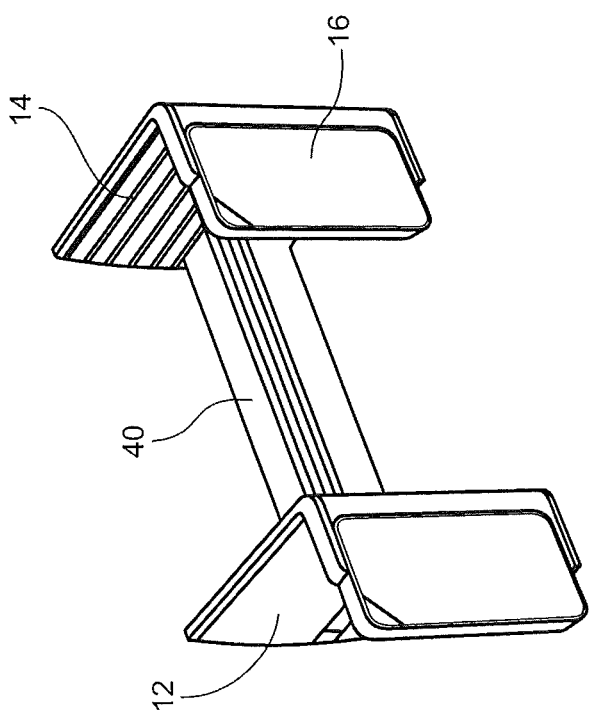
FIG. 3 is a perspective view of a premium class aircraft passenger suite, with the seating elements omitted, showing the bed in a stowed position.
Figure 5:
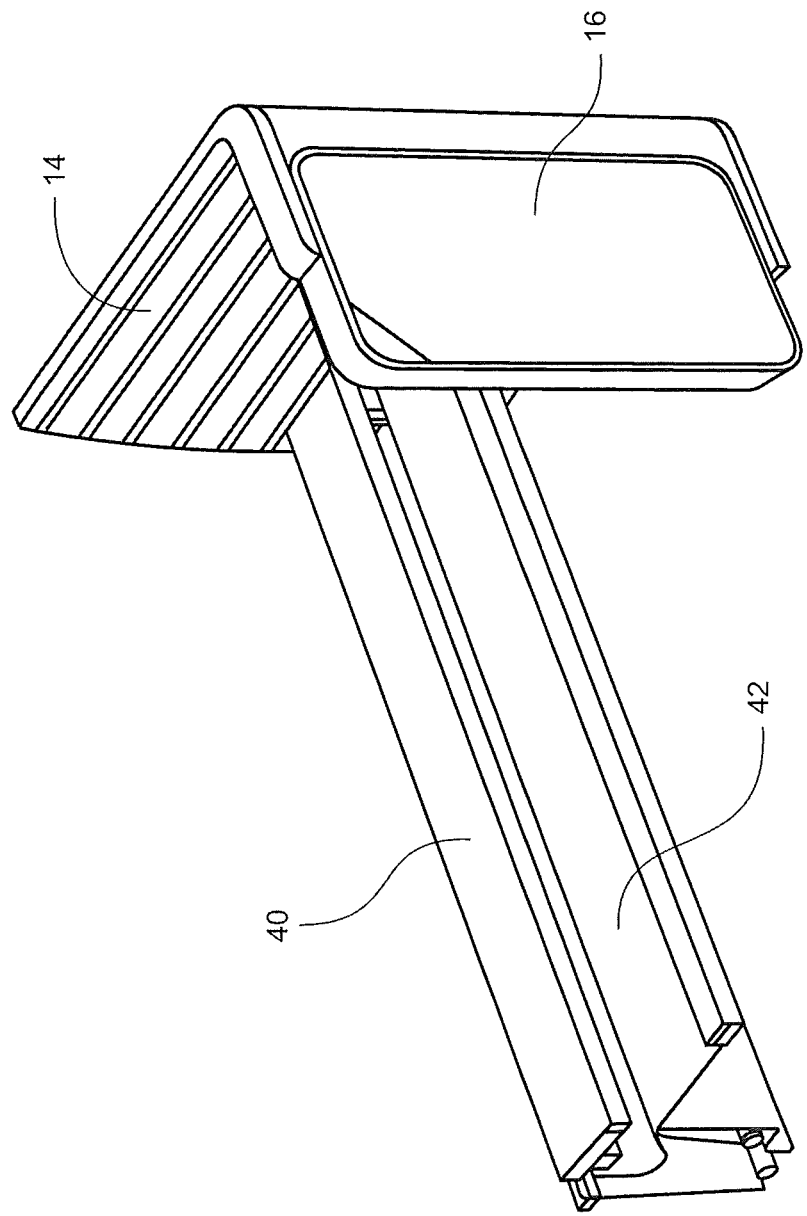
FIG. 5 is a fragmentary perspective view of the bed mechanism during deployment.

As is shown in FIG. 3, the bed 42 is folded to fit into the cabinet 40 when stowed. As shown in FIGS. 4 and 5, the membrane 44 rolls out of the cabinet 40 transversely across the width of the suite 10 into its lie flat configuration, and as shown in FIG. 2, provides a 30" wide bed 42 which stows into the 8.7 inch space referenced above. FIG. 5 illustrates this movement with the membrane 42, but the overlying mattress 46 is not shown.

Figure 6:
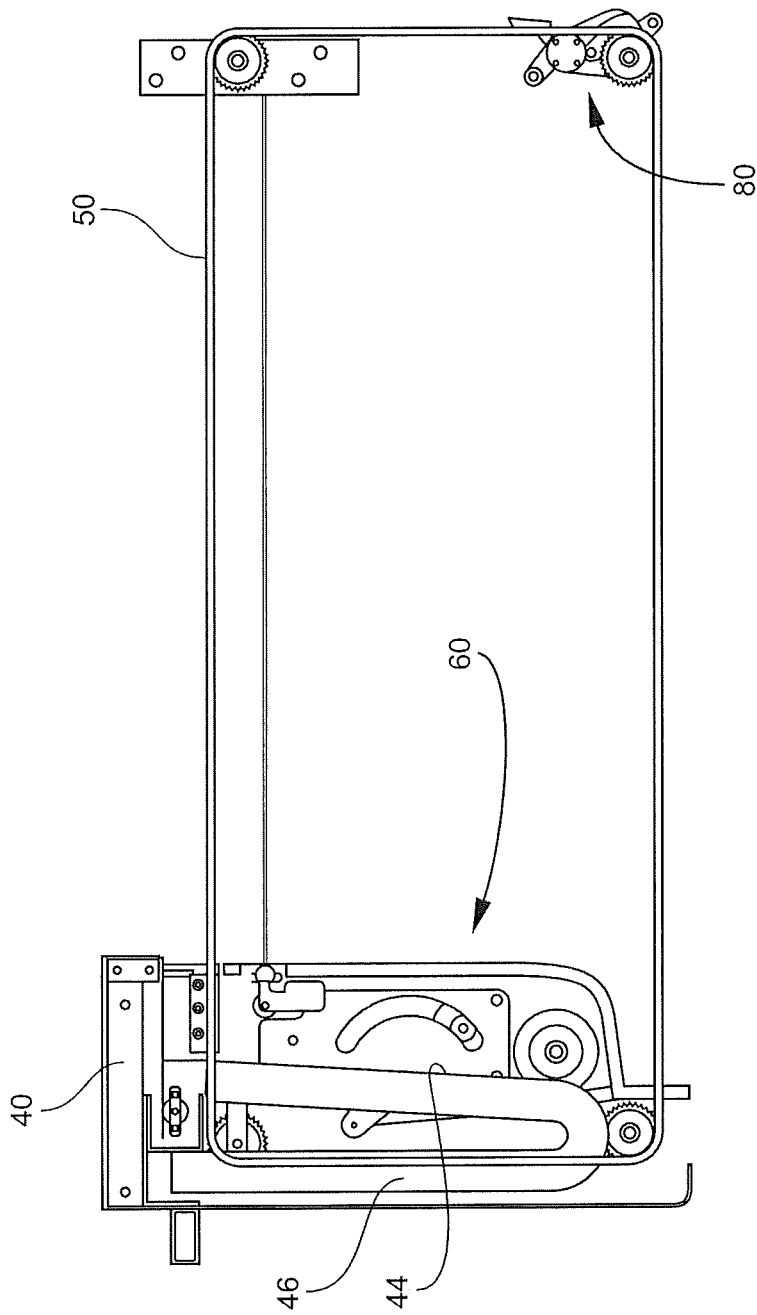
FIGS. 6, 7 and 8 are vertical cross-sections of the bed mechanism showing the bed in the stowed position.
Figure 7:
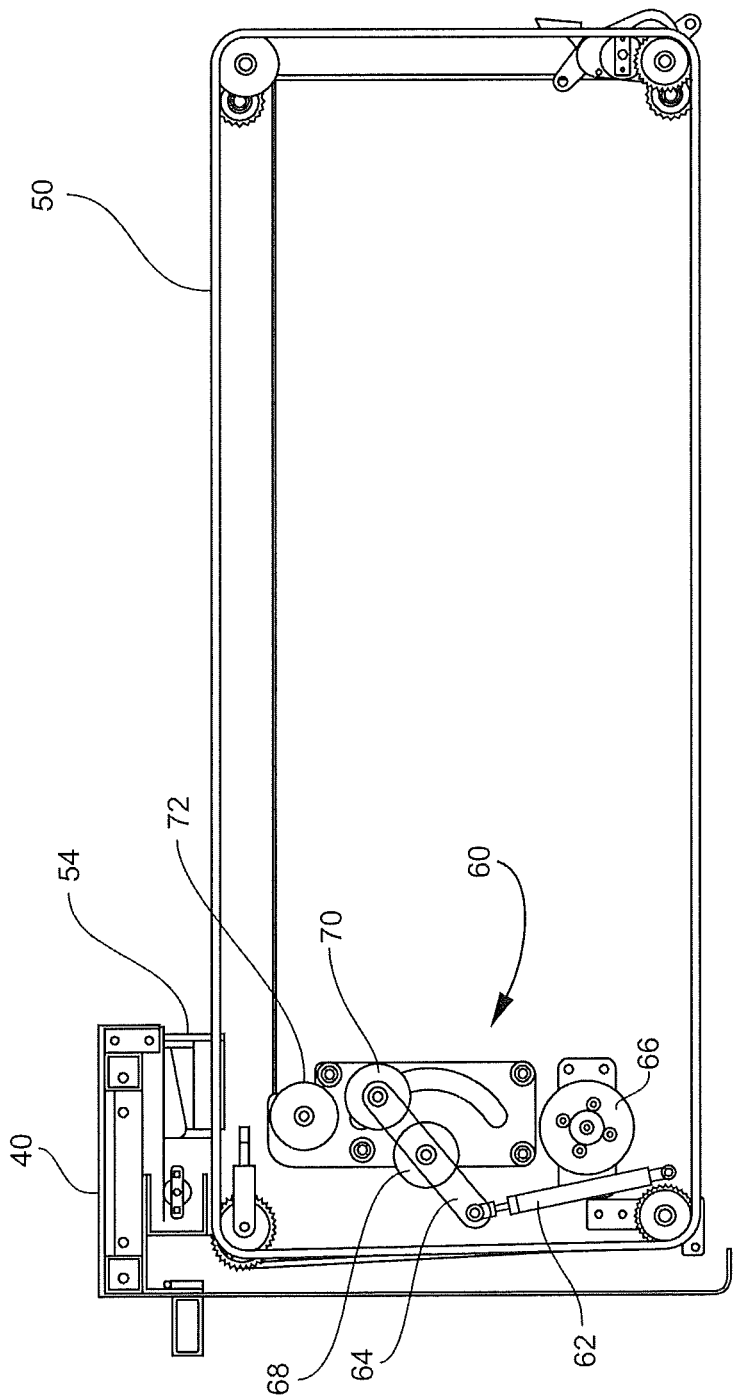
Figure 8:
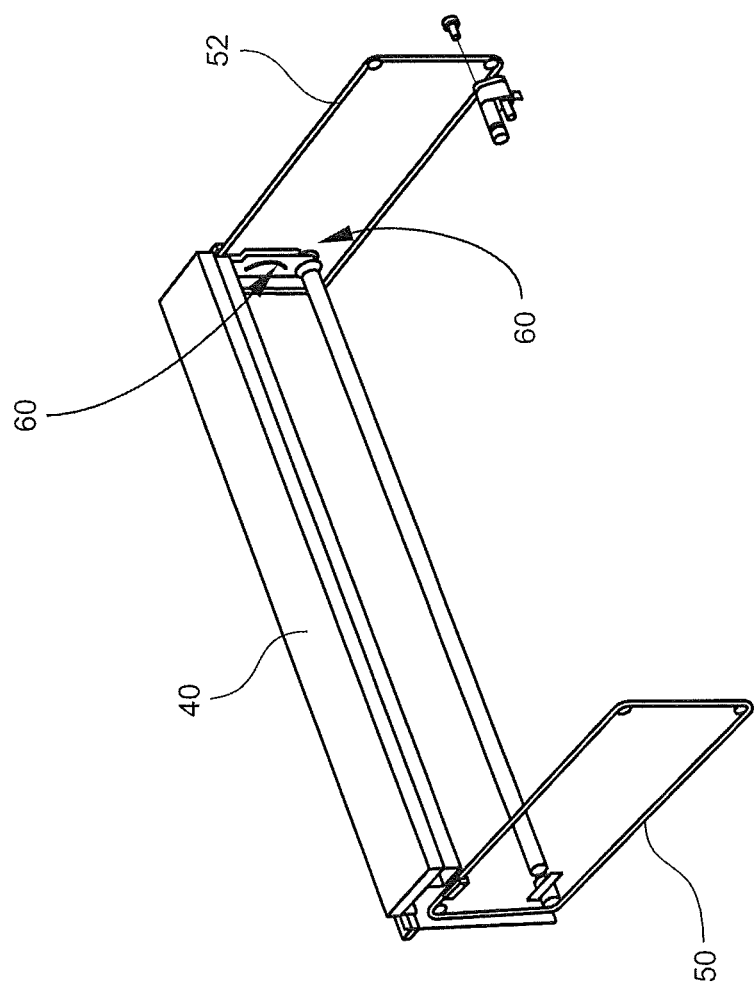
Figure 11:
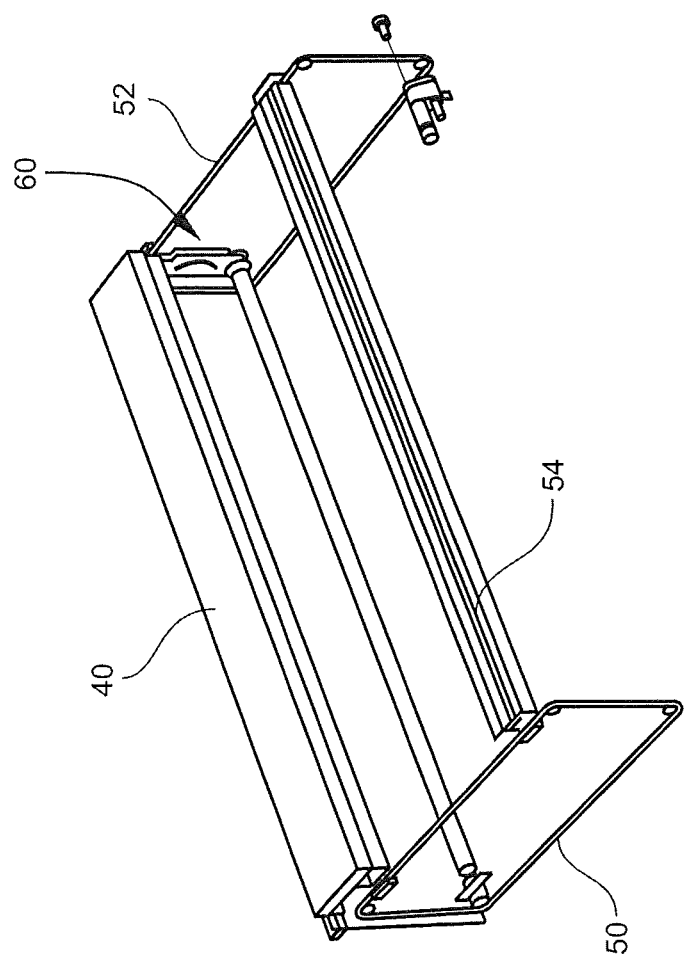

As is shown in FIGS. 6-8, the bed 42 includes drive belts 50 and 52 that deploy the bed 42 from its folded and stowed position. The bed 42 is constructed of a support beam 54 with the flexible membrane 44 and mattress 46 suspended from the support beam 54 and the two drive belts 50 and 52. See FIGS. 8 and 11. The static end of the bed 42 is attached to the cabinet 40. The drive belts 50, 52 move the support beam 54 and the attached membrane 42 from the cabinet 40 and into its horizontal deployed position.

Figure 9:
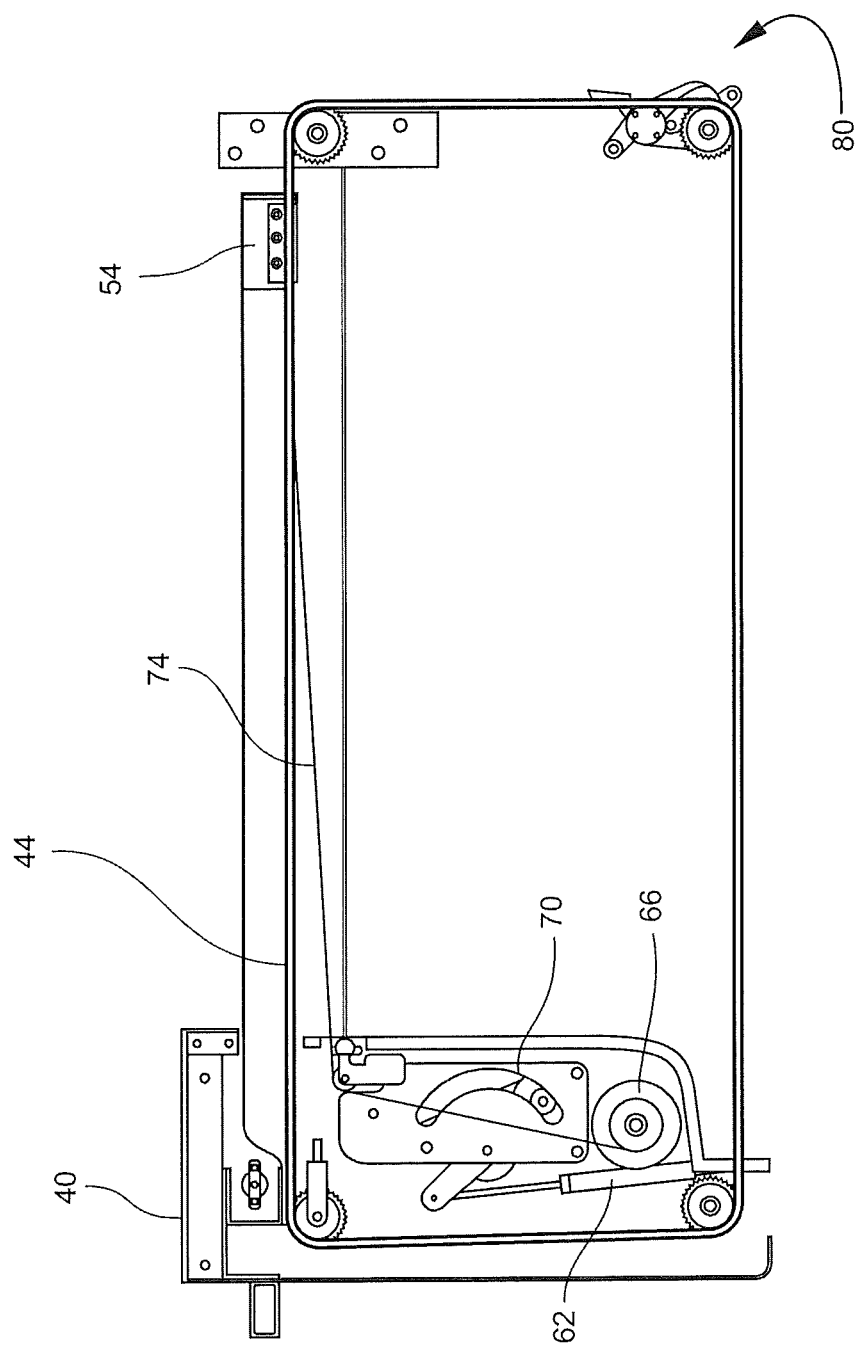
FIGS. 9, 10 and 11 are vertical cross-sections of the bed mechanism showing the bed in the deployed position.
Figure 10:
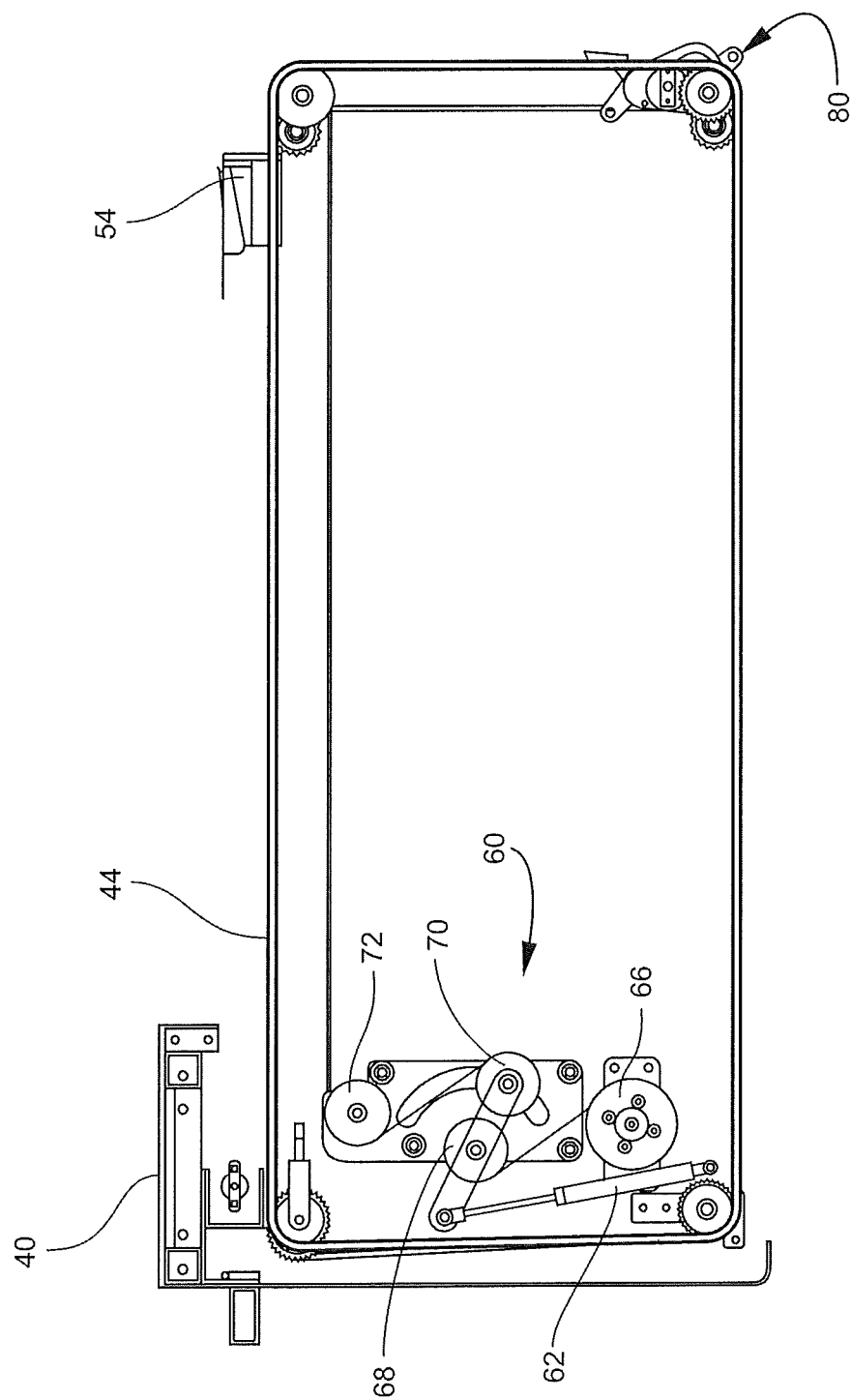

The bed 42 includes a tensioning apparatus 60 that guides the bed 42 smoothly between its stowed and deployed state. As is shown in FIGS. 7, 9 and 10, the tension is provided by a pneumatic cylinder 62 that exerts resistance pressure against the direction of movement of the drive belts 50, 52. The cylinder 62 also provides tension sufficient to provide support to the bed 42 under the weight of the recumbent passenger.

The tension cylinder 62 is connected to a control arm 64 mounted for pivotal movement. A series of guide rollers 66, 68, 70 and 72 carries a tension membrane 74 that is attached at a distal end to the support beam 54. The tension membrane 74 is stored on the roller 66 when the bed 42 is stowed.

To deploy the bed 42, an actuator motor assembly 80 drives the drive belts 50, 52 clockwise. The drive belts 50, 52 pull the support beam 54 to which is attached the bed membrane 44, which is carried by the drive belts 50, 52 across the width of the suite 10. At the same time, the tension membrane 74 deploys while under tension by the pneumatic cylinder 62.

Figure 12:
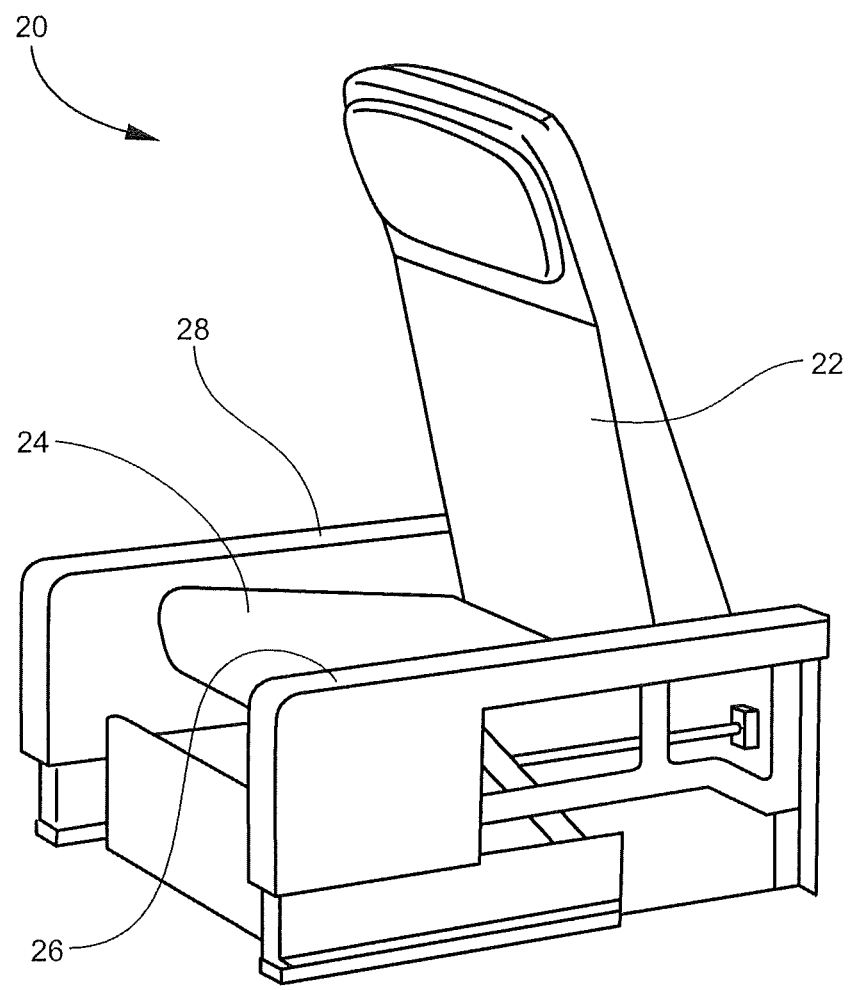
FIG. 12 is a perspective view of the main seat in a partially-stowed position.

Referring now to FIG. 12, an overall view of the seat 20 indicates that the seat back 22 is moveable in a forward translated manner onto the seat bottom 24 for stowage in a horizontal position immediately above the seat bottom 24. The seat back 22 is linked to the kinetic path of the seat bottom 24, and the seat back 22 is driven by a single motor. The seat 20 is mounted on a seat base 50 attached to the aircraft deck with suitable track fittings.

Figure 14:
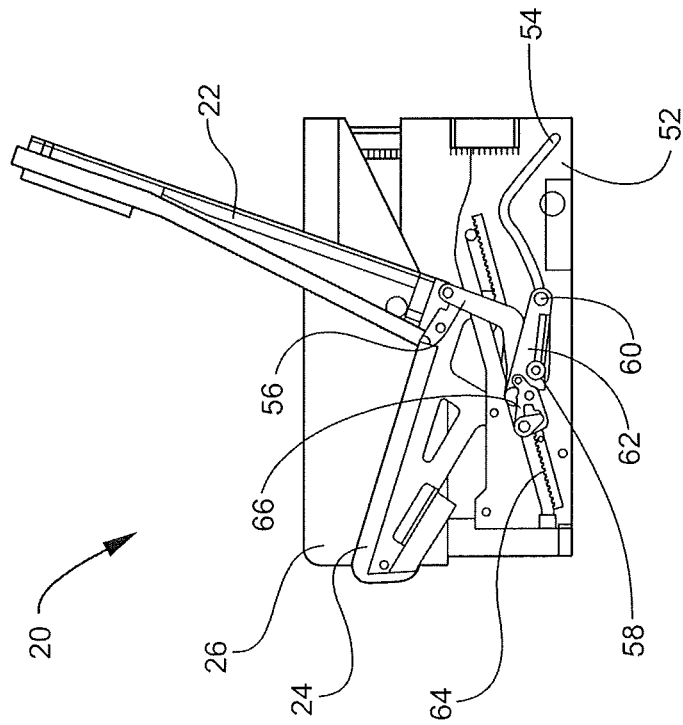
FIGS. 13 and 14 are side elevations of the main seat in its use position, with parts broken away.
Figure 13:
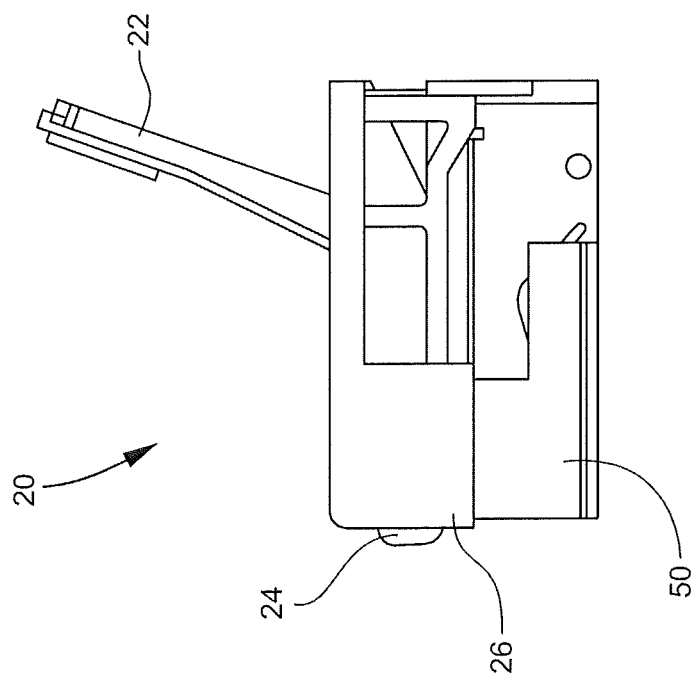
Figure 16:
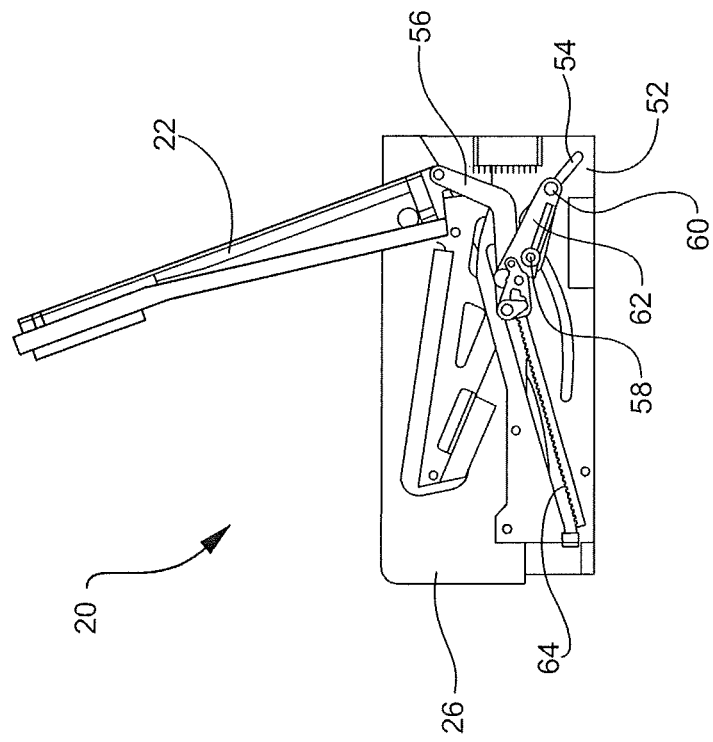
FIGS. 15 and 16 are side elevations of the main seat, with parts broken away for clarity, in a partially-stowed position corresponding to the position shown in FIG. 12.
Figure 15:
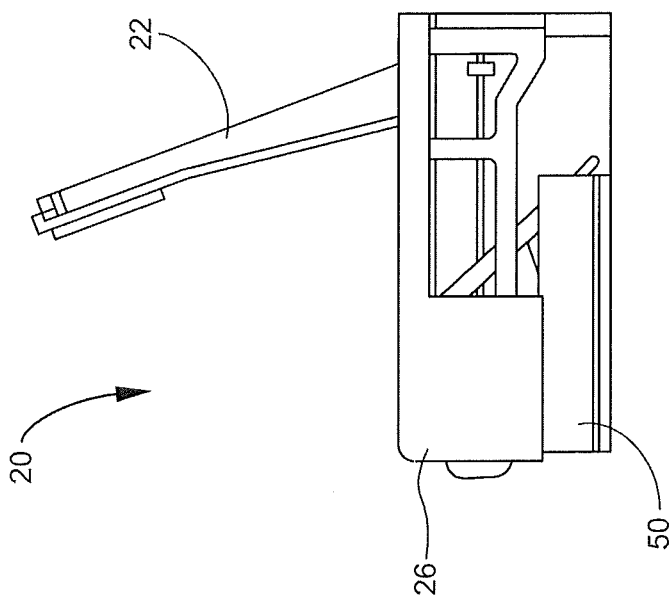
Figure 18:
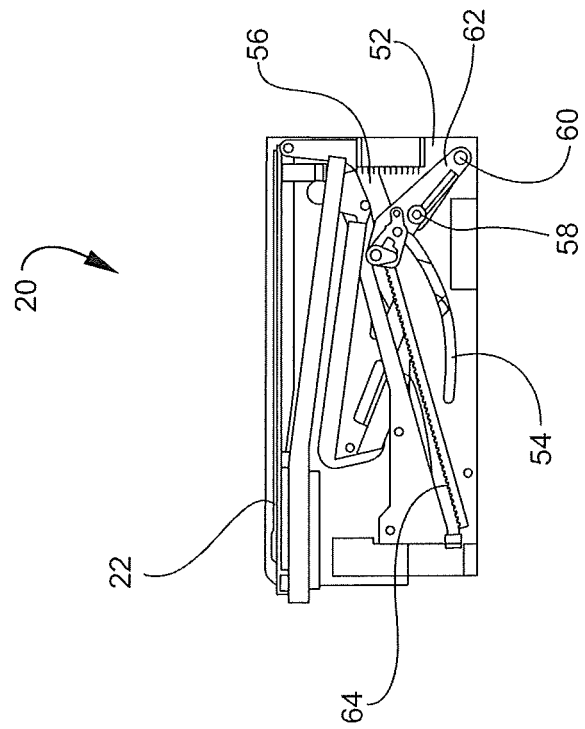
FIGS. 17 and 18 are side elevations of the main seat, with parts broken away for clarity, in a fully stowed position with the seat back fully forward and below the level of the deployed bed of FIG. 2.
Figure 17:
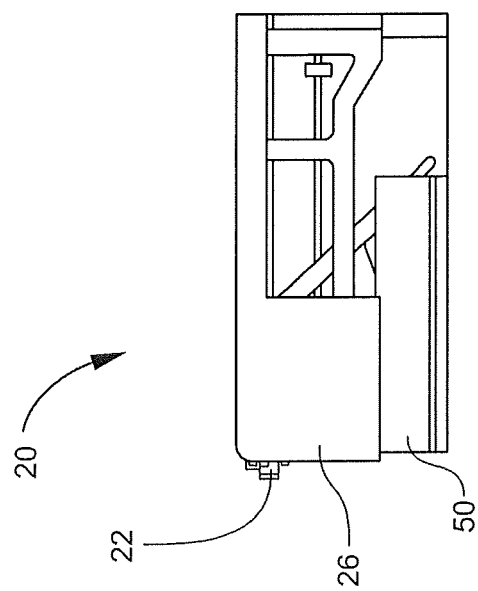

Referring now to FIGS. 13 and 14, the seat base 50 includes left and right side panels (only left side panel 52 shown) that includes a track 54 on which is mounted a link 56 with rollers 58, 60 carried on a pivotally-mounted arm 62. The rollers 58, 60 are mounted for movement in the track 54, as shown. A linear element 64 is positioned on the base and mounts a slide element 66. By comparing the positions of the rollers 58, 60 and the slide element 66 in FIGS. 14, 16 and 18, the movement of the seat back 22 into its stowed position is clearly illustrated. Note that the link 56 drives the seat back 22 into its stowed position at the end of the kinematic path defined by the track 54. Though not shown, the elements described above are found on both right and left sides of the seat 20 and operate to balance the forces operating on the seat back 22 and spread them across the width of the seat 20.

The stowage of the seat back 22 is accomplished by the movement out of the seat back 22 automatically as part of the seat's kinetic path. The seat back 22 folds forwardly out the way of the separate deployed bed 42, and does not form part of the bed 42. For these reasons, the bed 42 and the seat 20 can be each designed with materials that lead to significantly higher degrees of comfort for both, rather than with materials that serve both as a seat and bed and compromise the comfort of both.

Figure 19:
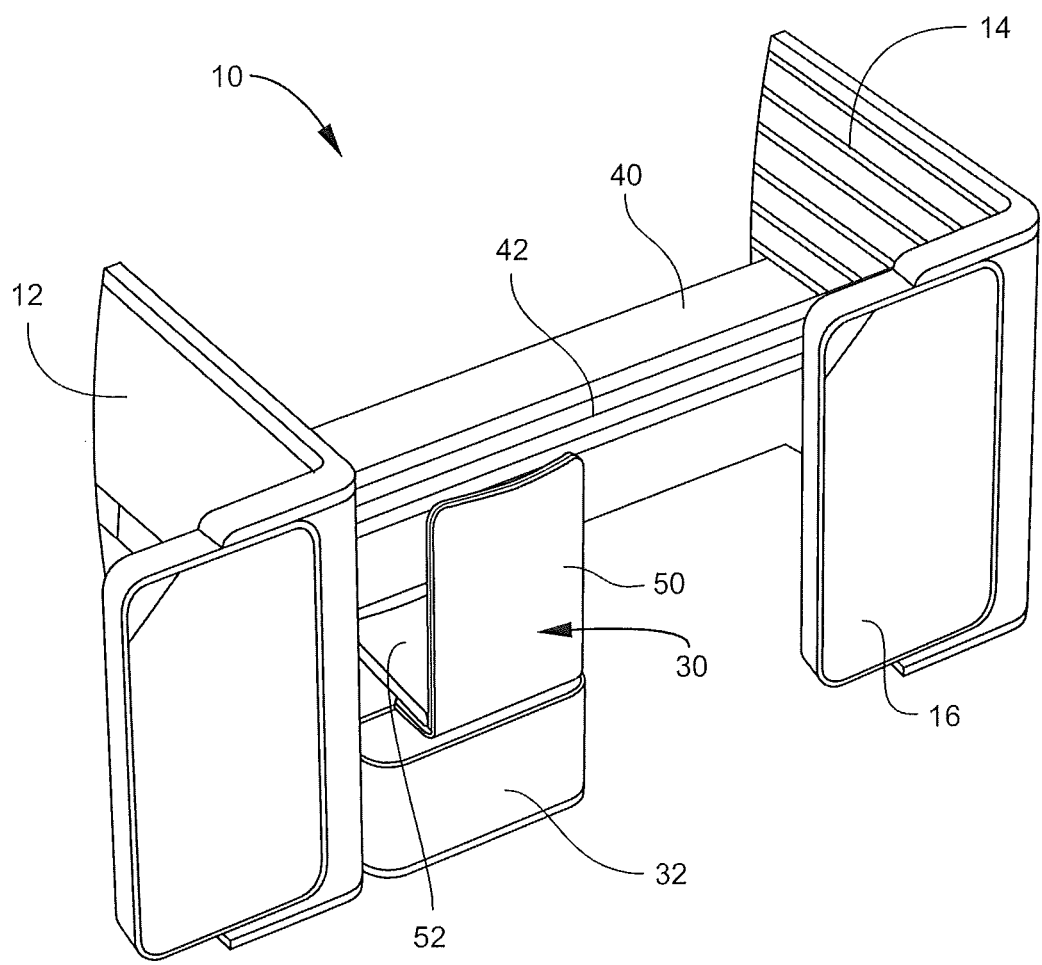
FIG. 19 is a perspective view of a premium class aircraft passenger suite in the stowed bed configuration with the main seat removed for clarity.
Figure 20:
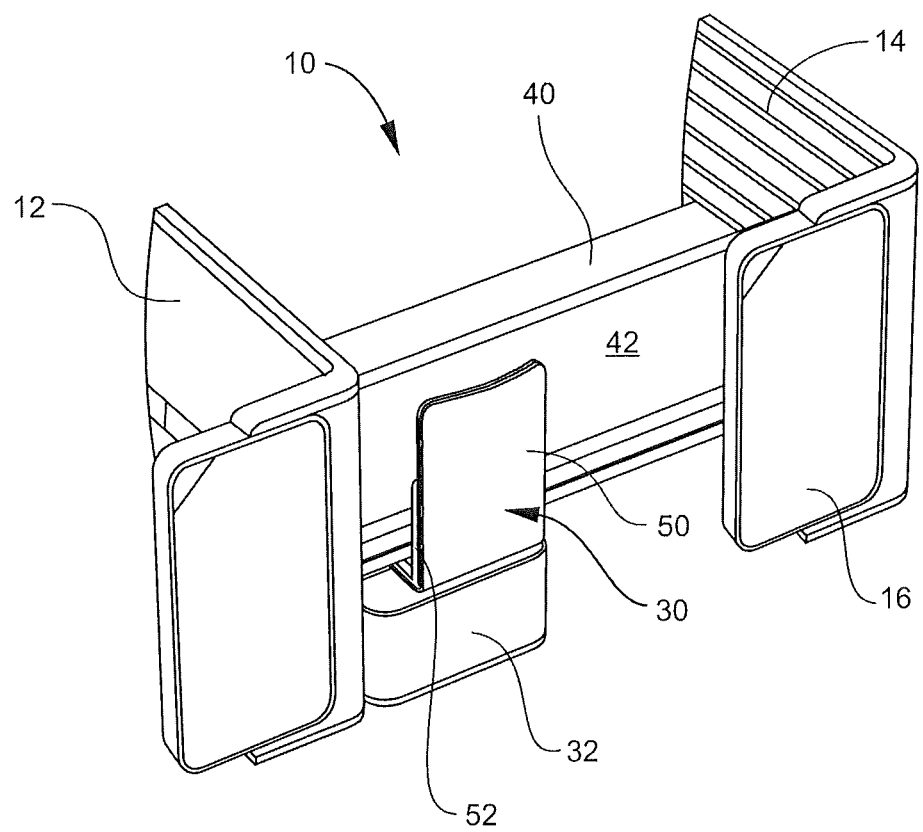
FIG. 20 is a perspective view of the passenger suite of FIG. 19 showing the work/dining chair in its stowed position.

Referring now to FIGS. 19 and 20, the relative positions of the stowed and deployed work/dining chair and the deployed and stowed bed 42 are illustrated in FIGS. 7 and 8.

FIGS. 21, 22 and 23 show the work/dining chair 30 in its stowed, intermediate and deployed positions. Chair 30 includes an L-shaped support structure 54. The support structure 54 supports the upright seat back 50 and seat bottom 52. The deployed seat bottom 52 occupies space that the deployed bed 42, see FIG. 20, must also occupy. For this reason, the seat bottom 52 must be stowed before the bed 42 is deployed. In order to avoid requiring the flight attendant or passenger attend to this function and possibly forget to stow the seat bottom 52, this function is carried out automatically. As is shown in FIGS. 21 and 22, an electromagnet 56 is positioned on the support 54 adjacent the rear of the seat bottom 52. A block of ferrous material 56 is positioned on the rear part of the lower surface of the seat bottom 52 proximate the electromagnet 56. The seat bottom 52 is normally held down in a horizontal, deployed position by the energized electromagnet 56. The electromagnet 56 is electronically synchronized with the bed 42 deployment mechanism, and as the bed 42 begins to deploy the electromagnet 56 is de-energized, releasing the seat bottom 52 and allowing it to rise to its stowed position under the influence of a spring, pneumatic actuator or other lifting mechanism. FIGS. 24 and 25 further illustrate the spacial relationship between the work/dining chair 30 and the bed 42.

Referring now to FIGS. 26 and 27, the function and operation of the table 34 is shown. Reference back to FIG. 1 shows the table 36 in its stowed position. In their stowed positions the tables 34, 36 rest on the top surface of the cabinet 40. The table 34 is positioned in a folded position in a slide bracket 44. The table 34 is formed of two table panels 34A, 34B attached by a piano-type hinge that permits the table panel 34B to be opened into the position shown in FIG. 26. The table 34 is further deployed by pulling the table out and away from the cabinet 40 by means of the slide bracket 44 and, as well, shifting the table laterally if desired. Table 34 is ideally suited for use as a work and dining table. The work/dining chair 30 provides the passenger with a comfortable chair with an upright back. The cabinet 40 includes a front panel 46 behind which is stowed the bed 42 when not in use. The front panel 46 includes a recess 48 which permits the feet of the occupant of the chair 30 to be positioned in a natural, comfortable position.

FIG. 27 shows the table 34 deployed from its position on the cabinet 40.

In one arrangement, the passenger seated in the chair 30 can also use the table 36 as a further work or meal surface while also using the table 34. Table 36 is mounted on the cabinet 40 on a pivot arm, not shown.

In another arrangement, a second passenger may sit in the main seat 20 and, by rotating the table 36 into position in front of the main seat 20, use the table 36 as a meal or work table. Thus, two passengers may use the suite 10 at the same time to dine or work together. This arrangement thus provides comfortable, spacious accommodations not presently found in any aircraft environment.

A bed for a premium class aircraft passenger suite according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A premium class passenger suite, comprising:
   (a) first and second spaced-apart end walls adapted to be positioned along a longitudinal axis of an aircraft cabin to define an enclosure therebetween;
   (b) an elongate cabinet extending along a length of the suite between the first and second end walls;
   (c) a flexible membrane positioned in the cabinet and movable between a stowed, folded position and a deployed unfolded position across the length of the suite and a width of the suite between the first and second end walls
   (d) a main seat positioned adjacent the first end wall of the passenger suite, and including a seat bottom and a seat back facing the second end wall of the passenger suite;
   (e) a bed having a flexible mattress that is coextensive with the flexible membrane, positioned in an overlying position on the membrane and movable between a stowed position in the elongate cabinet, and a deployed position above and separate from the main seat; and
   (f) the main seat configured to be movable between a seating position when the bed is stowed, and a stowed position with a lowered seat back when the bed is deployed for use, the seat in its stowed position being beneath and separate from the bed.

2. A premium class passenger suite according to claim 1, and including:
   (a) a work/dining chair positioned adjacent the second end wall of the suite and facing in a direction perpendicular to the main seat; and
   (b) a work/dining table positioned on the elongate cabinet opposite the work/dining chair and movable between a stowed position above the cabinet and a deployed use position between the cabinet and the work/dining chair.

3. A premium class passenger suite according to claim 2, wherein the work/dining chair includes a base on which is positioned a chair bottom that is movable between a deployed seating position and a raised, stowage position.

4. A premium class passenger suite according to claim 2, wherein:
   (a) the work/dining chair includes a base on which is positioned a chair bottom that is movable between a deployed seating position and a raised, stowage position, the deployed seating position being in an interference position with the bed when deployed;
   (b) an electromagnet positioned on the base for holding the chair bottom in a lowered, seating position when energized by interaction with a ferrous material located on the chair bottom; and
   (c) a synchronization assembly for electrically synchronizing the deployment of the bed with the chair bottom whereby, as the bed begins to deploy, the electromagnet is de-energized, releasing the chair bottom and allowing it to rise to its stowed position under the influence of a lifting mechanism.

5. A premium class passenger suite according to claim 1, and including:
   (a) a work/dining chair positioned adjacent the second end wall of the suite and facing in a direction perpendicular to the main seat;
   (b) a first work/dining table positioned on the cabinet opposite the work/dining chair and movable between a stowed position above the cabinet and a deployed use position between the cabinet and the work/dining chair;
   (c) the cabinet having a front panel that includes a foot recess which permits feet of a work/dining chair occupant to be positioned in natural, comfortable position; and (d) a second table positioned on the cabinet and pivotable between a stowed position above the cabinet and a deployed use position in front of the main seat.

6. A premium class passenger suite, comprising:
(a) an elongate cabinet extending along the length of the suite between first and second end walls, the first and second end walls positioned along a longitudinal axis of an aircraft cabin;
(b) a main seat positioned in the suite adjacent the first end wall of the passenger suite, and including a seat bottom, left and right arm rests, and a seat back facing the second end wall of the passenger suite;
(c) a bed having a flexible mattress that is coextensive with a flexible membrane extending across the length and a width of the suite between the first and second end walls and movable between a stowed position in the elongate cabinet, and a deployed position above and separate from the main seat such that the mattress and the membrane move together from the cabinet to the deployed position;
(d) a drive apparatus for driving the bed between the stowed and deployed positions; and
(e) the main seat configured to be movable between a seating position when the bed is stowed, and a stowed position with a lowered seat back when the bed is deployed for use, the seat in its stowed position being beneath and separate from the bed.

7. A premium class passenger suite according to claim 6, and including:
(a) a work/dining chair positioned adjacent the second end wall of the suite and facing in a direction perpendicular to the main seat; and
(b) a work/dining table positioned on the elongate cabinet opposite the work/dining chair and movable between a stowed position above the cabinet and a deployed use position between the cabinet and the work/dining chair.

8. A premium class passenger suite according to claim 6, and including:
(a) a work/dining chair positioned adjacent the second end wall of the suite and facing in a direction perpendicular to the main seat;
(b) a first work/dining table positioned on the cabinet opposite the work/dining chair and movable between a stowed position above the cabinet and a deployed use position between the cabinet and the work/dining chair;
(c) the cabinet having a front panel that includes a foot recess which permits feet of a work/dining chair occupant to be positioned in natural, comfortable position; and
(d) a second table positioned on the cabinet and pivotable between a stowed position above the cabinet and a deployed use position in front of the main seat.

9. A premium class passenger suite according to claim 8, wherein the work/dining chair includes a base on which is positioned a chair bottom that is movable between a deployed seating position and a raised, stowage position.

10. A premium class passenger suite according to claim 8, wherein:
(a) the work/dining chair includes a base on which is positioned a chair bottom that is movable between a deployed seating position and a raised, stowage position, the deployed seating position being in an interference position with the bed when deployed;
(b) an electromagnet positioned on the base for holding the chair bottom in a lowered, seating position when energized by interaction with a ferrous material located on the chair bottom; and (c) a synchronization assembly for electrically synchronizing the deployment of the bed with the chair bottom whereby, as the bed begins to deploy, the electromagnet is de-energized, releasing the chair bottom and allowing it to rise to its stowed position under the influence of a lifting mechanism.

11. A method of providing sitting, sleeping, working and dining features for a passenger of a premium class passenger suite, and including the steps of:
(a) providing an elongate cabinet extending along the length of the suite between first and second end walls, the first and second end walls positioned along a longitudinal axis of an aircraft cabin;
(b) providing a main seat positioned in the suite adjacent the first end wall of the passenger suite;
(c) providing a bed having a flexible mattress that is coextensive with a flexible membrane extending across the length and a width of the suite between the first and second end walls and movable between a stowed position in the elongate cabinet to one side of the main seat and a deployed position above and separate from the main seat;
(d) providing a drive apparatus for driving the bed between the stowed and deployed positions such that the mattress and the membrane move together from the cabinet to the deployed position; and
(e) configuring the main seat to be movable between a seating position when the bed is stowed and a stowed position with a lowered seat back when the bed is deployed for use, the seat in its stowed position being beneath and separate from the bed, and first and second spaced-apart end walls adapted to be positioned along a longitudinal axis of an aircraft cabin to define an enclosure therebetween.

12. A method according to claim 11, and including the step of positioning the main seat adjacent the first end wall of the passenger suite, and providing the main seat with a seat bottom, left and right arm rests, and a seat back facing the second end wall of the passenger suite.

13. A method according to claim 12, and including the steps of:
(a) providing a work/dining chair positioned adjacent the second end wall of the suite and facing in a direction perpendicular to the main seat; and
(b) providing a work/dining table positioned on the elongate cabinet opposite the work/dining chair and movable between a stowed position above the cabinet and a deployed use position between the cabinet and the work/dining chair.

14. A method according to claim 12, and including the steps of:
(a) providing a work/dining chair positioned adjacent the second end wall of the suite and facing in a direction perpendicular to the main seat;
(b) providing a first work/dining table positioned on the cabinet opposite the work/dining chair and movable between a stowed position above the cabinet and a deployed use position between the cabinet and the work/dining chair, the cabinet having a front panel that includes a foot recess which permits feet of a work/dining chair occupant to be positioned in natural, comfortable position; and
(c) providing a second table positioned on the cabinet and pivotable between a stowed position above the cabinet and a deployed use position in front of the main seat.

15. A method according to claim 14, and including the step of providing a base for the work/dining chair, the chair bottom of the work/dining chair being positioned on the base and movable between a deployed seating position and a raised, stowage position.

16. A premium class passenger suite, comprising:
(a) first and second spaced-apart end walls adapted to be positioned along a longitudinal axis of an aircraft cabin to define an enclosure therebetween;
(b) a bed having a flexible mattress of predetermined dimensions and movable between a stowed position to one side of a main seat, and a deployed position above and separate from the main seat;
(c) the main seat positioned in the suite adjacent the first end wall of the passenger suite, and including a seat bottom, left and right arm rests, and a seat back facing the second end wall of the passenger suite, the main seat configured to be movable between a seating position when the bed is stowed, and a stowed position with a lowered seat back when the bed is deployed for use, the seat in its stowed position being beneath and separate from the bed;
(d) a drive apparatus for driving the bed between the stowed and deployed positions;
(e) a work/dining chair positioned adjacent the second end wall of the suite and facing in a direction perpendicular to the main seat;
(f) a work/dining chair base on which is positioned a chair bottom that is movable between a deployed seating position and a raised, stowage position, the deployed seating position being in an interference position with the bed when deployed;
(g) an electromagnet positioned on the work/dining chair base for holding the chair bottom in a lowered, seating position when energized by interaction with a ferrous material located on the chair bottom;
(h) a synchronization assembly for electrically synchronizing the deployment of the bed with the chair bottom whereby, as the bed begins to deploy, the electromagnet is de-energized, releasing the chair bottom and allowing it to rise to its stowed position under the influence of a lifting mechanism; and
(i) a work/dining table positioned on an elongate cabinet opposite the work/dining chair and movable between a stowed position above the cabinet and a deployed use position between the cabinet and the work/dining chair.

17. The premium class passenger suite of claim 16 further comprising:
(a) a flexible membrane positioned in the cabinet and movable between a stowed, folded position and a deployed unfolded position extending across a width of the suite between the first and second end walls and (b) wherein the flexible mattress is coextensive with the flexible membrane and is positioned in an overlying position on the membrane and movable with the membrane between a stowed, folded position and a deployed unfolded position extending across a width of the suite between the first and second end walls.

* * * * *

UNITED STATES PATENT AND TRADEMARK OFFICE
CERTIFICATE OF CORRECTION

| | | |
|---|---|---|
| PATENT NO. | : 9,033,413 B2 | Page 1 of 1 |
| APPLICATION NO. | : 13/798783 | |
| DATED | : May 19, 2015 | |
| INVENTOR(S) | : Matt Round et al. | |

It is certified that error appears in the above-identified patent and that said Letters Patent is hereby corrected as shown below:

In the Claims

Column 8, line 10, Claim 1, insert the word --extending-- after the word position.

Column 12, line 22, Claim 16, after the words "between the first and second end walls and", indent "(b) wherein" to the next line to show outline indention.

Signed and Sealed this
Eighth Day of September, 2015

Michelle K. Lee
*Director of the United States Patent and Trademark Office*